United States Patent [19]

Eberle

[11] 4,221,523
[45] Sep. 9, 1980

[54] APPARATUS FOR DUMPING AND COLLECTING CORROSIVE SUBSTANCES FROM AUTOMOTIVE BATTERIES

[75] Inventor: William J. Eberle, Reading, Pa.

[73] Assignee: General Battery Corporation, Reading, Pa.

[21] Appl. No.: 919,490

[22] Filed: Jun. 27, 1978

Related U.S. Application Data

[60] Continuation-in-part of Ser. No. 894,349, Apr. 7, 1978, which is a continuation-in-part of Ser. No. 866,515, Jan. 3, 1978, which is a division of Ser. No. 669,216, Mar. 22, 1976, Pat. No. 4,081,093.

[51] Int. Cl.$^2$ ............................................. B65G 65/34
[52] U.S. Cl. ............................... 414/421; 294/63 A; 414/415
[58] Field of Search ............................ 414/419–421; 294/63 A; 105/468; 206/522

[56] References Cited

U.S. PATENT DOCUMENTS

| 2,609,113 | 9/1952 | Huffman | 294/63 A X |
| 3,167,196 | 1/1965 | Eberle | 414/421 X |

Primary Examiner—Robert G. Sheridan
Attorney, Agent, or Firm—Benasutti Associates, Ltd.

[57] ABSTRACT

A novel battery dumping apparatus is described which is uniquely suited for dumping corrosive substances, such as battery acid, simultaneously from a number of batteries. The novel apparatus generally comprises a sealed tube adapted for rotation through an arc of less than 360 degrees for inverting batteries contained therein. Novel sealing and pouring means disposed at opposite ends of the tubular member provide for safe collection of the dumped corrosive liquids. Four inflatable members of novel construction are appropriately positioned within the tube for the purpose of selectively gripping groups of batteries to be inverted. The inflatable members are pressurized for engaging the batteries and are vented to an evacuated tank to release them. A novel hydraulic piston is utilized as a safety interlock to prevent batteries in the inverted position from being released by the inflated gripping members. Within the tube are disposed two parallel spaced apart baffles, which together form a sealed battery processing channel. This battery processing channel is pierced by a plurality of rods disposed in a plane which bisects the aforementioned baffles. These rods are ultimately caused to rotate in opposite directions by a gear drive disposed outside of said battery processing channel but within said tubular member. These gears are, in turn, caused to drive said rods by a pneumatic motor which is mounted outside of said tubular member.

8 Claims, 12 Drawing Figures

APPARATUS FOR DUMPING AND COLLECTING CORROSIVE SUBSTANCES FROM AUTOMOTIVE BATTERIES

CROSS REFERENCE TO RELATED APPLICATIONS

The present application is a continuation-in-part of my prior co-pending patent application Ser. No. 894,349, filed Apr. 7, 1978, entitled "Acid-Proof Conveyor", which application is a continuation-in-part of my co-pending application Ser. No. 866,515, filed Jan. 3, 1978 entitled, "APPARATUS FOR DUMPING AND COLLECTING CORROSIVE SUBSTANCES FROM AUTOMOTIVE BATTERIES", which in turn is a divisional of Ser. No. 669,216, filed Mar. 22, 1976 entitled, "APPARATUS FOR DUMPING AND COLLECTING CORROSIVE SUBSTANCES FROM AUTOMOTIVE BATTERIES", now U.S. Pat. No. 4,081,093, dated Mar. 28, 1978, which applications are incorporated by reference as if fully set forth herein.

BACKGROUND OF THE INVENTION

The present invention relates generally to apparatus for dumping liquids from automotive batteries in a production line setting, and more particularly, to those apparatuses specifically designed for dumping corrosive liquids from groups of automotive batteries in a production line situation.

It is well known in the prior art to invert a plurality of containers travelling in a production line for labelling or dumping purposes. For example, U.S. Pat. No. 2,226,068 dated Dec. 24, 1940 entitled "Machine for Feeding Cans to Labelling Machines" describes a system for inverting tin cans. Similarly, U.S. Pat. No. 2,836,281 dated May 27, 1948 and entitled "Conveyor System" describes an apparatus intended primarily to invert filled bottles of beverage for the purpose of insuring proper mixture of their contents. Finally, in U.S. Pat. No. 2,865,411 dated Dec. 23, 1958 and entitled "Container Inverting Machine" an apparatus is described for inverting containers for washing or rinsing and particularly which is used to rinse and drain containers such as open topped jars which have already been filled with olives or similar food products.

Other apparatuses in the prior art relate to various dumping, inverting or tilting processes. In U.S. Pat. No. 2,766,469 dated Oct. 16, 1956 entitled "Automatic Chainer" a device is described which facilitates the tilting of drums which are being cleaned by an operation which is termed "chaining". In U.S. Pat. No. 2,756,883 dated July 31, 1956 entitled "Vat Lifting and Dumping Truck" an apparatus is described for hoisting, transporting and tilting barrel-like containers. This patent, and certain others described hereinafter, utilize inflatable means in order to engage the particular work piece. For example, U.S. Pat. No. 2,609,113 dated Sept. 2, 1952 entitled "Fork Structure for Lift Trucks and Hoists" relates to the use of an inflatable means described as "Expansible Grip Elements for the Tines of a Fork for a Lift Fork Which Can Apply a Uniform Gripping Pressure to a Series of Bricks or Similar Articles to Lift the Bricks and Other Bricks Stacked Upon Those Engaged by the Grips". In U.S. Pat. No. 3,056,625 dated Oct. 2, 1962 entitled "Lifting Device" a pneumatically expansible device is used to displace a pivotally mounted member adapted to engage the product to be lifted.

Although the above described patents do not relate specifically to the area of battery dumping apparatuses, more recently, apparatuses intended to invert batteries have been developed. U.S. Pat. No. 3,863,775 dated Feb. 4, 1975 and entitled "Method and Apparatus for Inverting Operations Associated with the Assembly of a Storage Battery" and owned by the assignee of the present invention, describes a hand operated apparatus intended primarily to invert the lead containing battery casing component and fit it onto an inverted lid component which has adhesive applied thereto, so as to join the components without seepage or dripping of any adhesive into the battery cells. Another battery inverting device is described in U.S. Pat. No. 2,988,239 dated June 13, 1961 entitled "Battery Acid Dumper". This patent generally related to a machine for dumping acid from batteries, and particularly relates to a machine capable of handling two groups of batteries at a time wherein acid may dumped from one group of batteries while the previously dumped group of batteries is removed from the machine and is replaced with another group of batteries intended for subsequent dumping. This apparatus is generally comprised of a hemi-cylindrical vat which is disposed under a pivoted conveying mechanism comprised generally of two parallel roller conveyors and a plurality of battery guide support frames, including a pair of side structures which are positioned adjacent the respective sides of the conveyor which are intended to engage and hold the batteries in the inverted position.

In U.S. Pat. No. 3,167,196 dated Jan. 26, 1965 entitled "Battery Aqualizing Apparatus" and owned by the assignee of the present invention, an apparatus is described which provides elongate inflatable battery gripping members which firmly but gently grip various sized and shaped batteries and which includes means for inverting the batteries for draining the water (or other chemicals) therefrom, and because of the resilient action of the inflated means, shake the battery on inverting and thereby prevent the retention of water inside the battery. The gripping members comprise expansible material which is supported and sealed by an external support member. Very generally, this patent discloses an improvement in a battery aqualizing apparatus for a battery emptying assembly which includes a rotatable support means, conveyor means for moving the batteries into and out of the emptying assembly and is connected to and supported by the rotatable support means, an elongate inflatable battery gripping member positioned along each edge of the conveyor means and carried by the rotatable support, whereby batteries on the conveyor may be gripped between the gripping members when they are inflated, and means for inverting the rotatable support thereby emptying the batteries held between the inflated gripping members. After emptying, the batteries are returned to the upright position and released by venting the inflated gripping members to the ambient atmosphere.

SUMMARY OF THE INVENTION

The present invention is an improvement on the apparatus described in U.S. Pat. No. 3,167,196.

During the manufacture of conventional automotive storage batteries, it may be required to dump corrosive substances from those batteries, such as when forming is completed and the relatively lower specific gravity forming acid is to be dumped in preference to higher specific gravity "finishing acid" which is subsequently to be introduced into the batteries. Certain problems are encountered in the dumping of acid from batteries in a production line which arise primarily from the corrosive nature of the liquids which are to be dumped. In particular, great care must be exercised in order to prevent acid from being introduced into the processing room, as well as to prevent dumped acid from spilling upon the exterior of the batteries during processing. In addition, care must be exercised in order to prevent the acid from acting upon the dumping apparatus itself. Finally, means should be provided to collect the dumped acid to allow that acid to be recycled or otherwise disposed of in an environmentally acceptable manner. These ends must be accomplished while at the same time ensuring that the batteries themselves are emptied as much as possible so that the higher specific gravity "finishing acid" is not unduly diluted by the generally lower specific gravity forming acid which is residually retained in the dumped battery.

The present invention provides a battery dumping apparatus which is extremely safe and durable. The apparatus generally comprises a substantially tubular member in which are disposed two parallel spaced apart baffles. The longitudinal edges of these baffles form an acid proof seal with the interior of the tubular member to define a battery processing chamber. This battery processing chamber is bisected by a single line of roller conveyors which pierce and are sealed with respect to the baffles. Disposed along the baffles adjacent the conveyors are novel means for gripping batteries within the battery processing chamber. The novel gripping means comprise expansible tubular members, each of which is disposed around a support member which is pivotally connected to the tubular member. The expansible tubular members are sealed at each end to form inflatable gripping members. The inflatable members are pressurized in order to grip the batteries and are evacuated to release them. Disposition of the support member within the sealed expansible tube prevents exposure to dumped or residual corrosive material. Evacuation permits rapid disengagement and greater clearance than permitted by merely venting to atmosphere. Greater clearance permits the use of larger more flexible inflatable members which in turn enables the secure gripping of smaller batteries, and the flexibility of the larger members enhances the shaking action.

The tubular member is mounted for rotation in an arc of approximately 180 degrees in such a way that the gearing and drive portions of the mechanism are always disposed on the hemispherical portion of that tubular member which is generally at or above a horitzontal plane longitudinally bisecting that member. As a result, it is virtually impossible for dumped or residual corrosive materials to come in contact with, and thereby corrode, the gearing mechanism powering the advance of the batteries within the tubular member. While the roller conveyor gear drive is disposed outside of the battery processing channel and within an "acid proof" passage within the tubular member, additional protection is provided to the conveyor motor by disposing that motor externally of the tubular member.

The device is pneumatically operated and further comprises novel control features which include a safety interlock preventing those batteries engaged in the inverted position from being accidentally dropped due to the evacuation of the appropriate expansible tubular members. Furthermore, all pneumatic lines extending from the control apparatus are carefully disposed within acid proof cavities, preventing those lines from coming under corrosive attack from the dumped material. A novel air injection means is provided allowing for an acid proof interconnection between the inflatable tubular members disposed on the interior of the battery processing chamber and the pneumatic lines disposed within adjacent acid proof channels. The tubular member of the preferred embodiment of the present invention is supported for rotation through approximately 180 degrees by a novel tracking means comprising a plurality of rubber tires and at least one longitudinal tracking assembly. The use of rubber tires which cause the tubular member to rotate until bracket stops are engaged by the tires provides for the additional shaking of the device, which shaking helps to dislodge acid from the interstices of the batteries to be dumped.

Accordingly, a primary object of the present invention is the provision of a safe and reliable battery dumping apparatus for use with corrosive liquids.

Another object of the present invention is the provision of a substantially tubular battery dumping apparatus having a sealed battery processing chamber disposed therein.

Another object of the present invention is the provision of an improved means for gripping batteries within the battery processing chamber.

A further object of the present invention is the provision of a battery dumping apparatus, the design of which minimizes the likelihood that either the apparatus or the batteries to be processed will be damaged or contaminated by corrosive liquids to be dumped.

Another aim of the present invention is the provision of a "fail safe" control means which eliminates the likelihood that batteries could be damaged during processing.

These and other objects of the present invention will become apparent from the following detailed description.

DETAILED DESCRIPTION OF THE DRAWINGS

Figure 1:
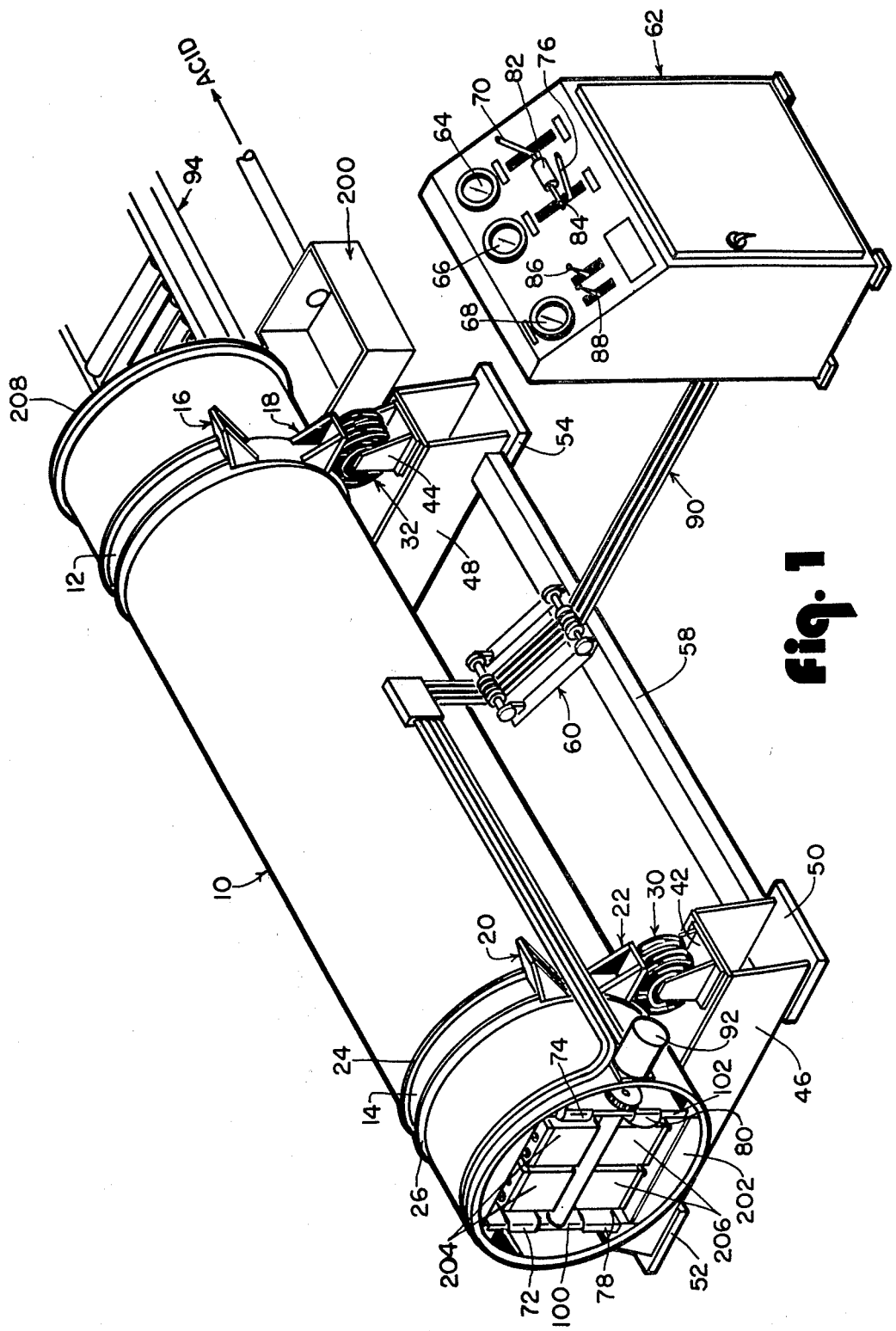
FIG. 1 is a perspective view of the preferred embodiment of the present invention.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
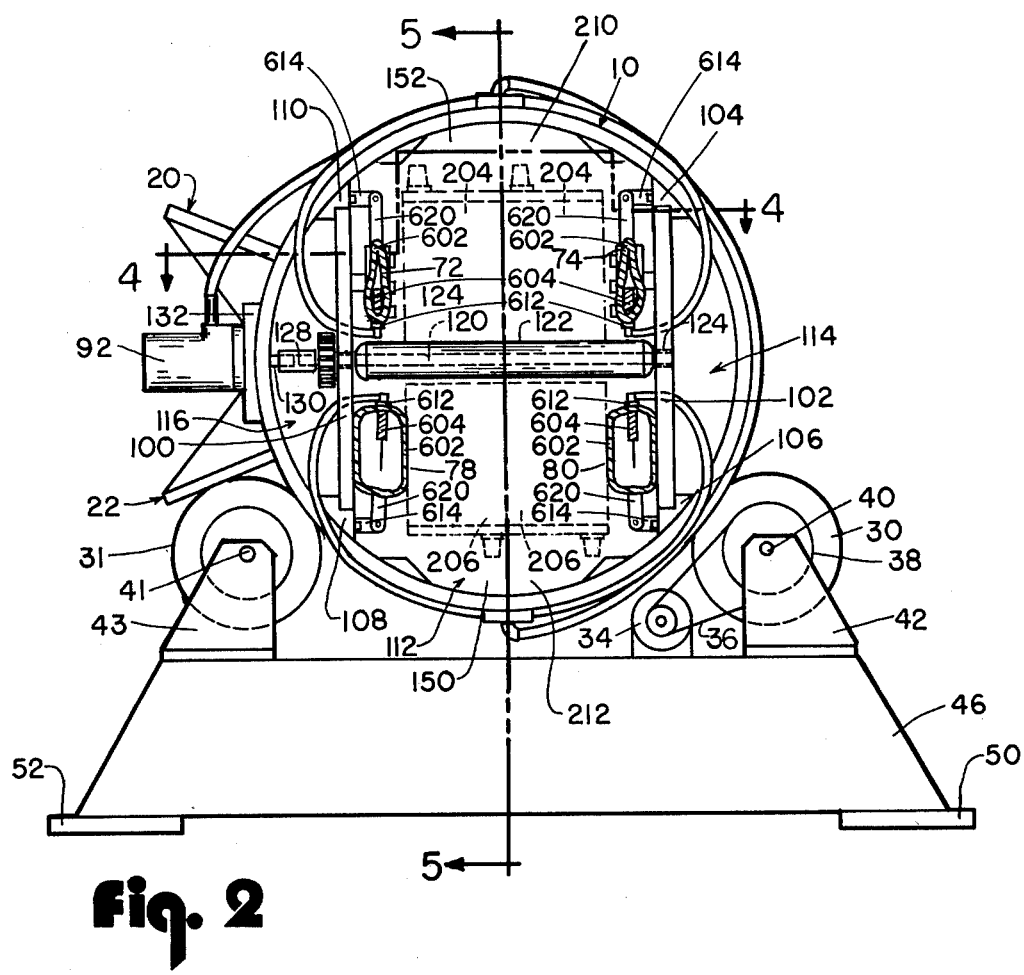
FIG. 2 is an end view taken on an enlarged scale of a preferred embodiment of the present invention similar to that illustrated in FIG. 1, with the roller conveyor motor and associated apparatus mounted on the opposite side of the tubular member from that shown in FIG. 1.

FIG. 1 is a perspective view of the preferred embodiment of the present invention showing the tubular member 10, which is composed of a substantially inert material having bands 12 and 14 disposed therearound. Mounted on these bands are bracket stops 16 and 18 on band 12, and 20 and 22 on band 14. Band 14 is further provided with upstanding flanges for engagement with longitudinal alignment means designated generally 28 shown in FIG. 5. Tubular member designated generally 10 is supported for rotation by inflatable tires 30, 31, 32 and 33, as seen in FIG. 2. At least one of these sets of tires is powered by a motor 34, by a belt 36 which may engage a pulley or other drive means disposed for rotation with the tires 30. Inflatable tires 30, 31, 32 and 33 are each mounted on axials 40 and 41 in FIG. 2, which in turn are supported by tire support brackets 42, 43, 44 and 45. These brackets are in turn mounted upon main supports 46 and 48, which are generally U-shaped members resting upon base plates 50 and 52 and 54 and 56 respectively. These main supports are aligned by longitudinal brace 58, which serves as a base for tension assembly designated generally 60. A control panel designated generally 62 is provided with pneumatic pressure indicating meters 64, 66 and 68, and a plurality of actuating control levers. As shown in FIG. 1, control lever 70 controls the degree of inflation as well as the evacuation of a pair of inflatable gripping members 72 and 74, while control lever 76 controls the degree of inflation as well as the evacuation of a pair of inflatable gripping members 78 and 80. Control lever 70 is shown in the "evacuated" position while control lever 76 is shown in the "inflated" position. A pneumatic cylinder 82 having piston rod 84 disposed therein is seen mounted between levers 70 and 76, which cylinder and piston rod 82 and 84 automatically operates in response to activation of rotation control levers 86 and 88. Take-up means (not shown in the drawings) is connected to pneumatic lines designated generally 90, which lines are shown threaded through tension assembly designated generally 60 prior to the points of attachment of the lines to the exterior surface of tubular member designated generally 10. From this point of attachment, the lines are seen in FIG. 1 to run longitudinally along an axis parallel to tubular member designated generally 10 to the "upper" end of that tubular member wherein these pneumatic lines enter roller conveyor motor 92 for the "acid proof" channel disposed on either side of the battery processing channel, as will be described more fully herein.

Referring now to the interior of the tubular member, designated generally 10, two baffles 100 and 102 are disposed in a parallel spaced apart relationship within the tubular member to form a battery processing channel. These baffles are longitudinally sealed to the interior of the drum by triangular brackets 104, 106, 108 and 110, which are solid pieces which extend along the entire length of their respective baffles and which are composed of an inert material such as teflon which, in addition to providing a good seal with the associated baffles and the interior of tubular member 10, also allows the baffles, and all of the structures supported thereby, to slide longitudinally within the tubular member so that individual components disposed within the tubular member designated generally 10 may be easily serviced. Referring to FIG. 2, baffles 102 and 100 are seen to form three channels within tubular member 10: a first battery processing channel designated generally 112, a second "acid free" channel designated generally 114, and a third acid-free channel designated generally 116. As seen in FIG. 2, acid-free channel designated generally 116 may be considered the "upper" battery channel in that this channel, upon rotation of the tubular member 10, moves above the horizontal plane bisecting the tubular member, whereas acid-free channel 114 generally moves below the horizontal plane.

Disposed within a plane which bisects both battery processing channel 112 and baffles 100 and 102 is a conveying apparatus, a preferred embodiment of which is disclosed in my prior co-pending U.S. patent application Ser. No. 894,349, entitled, "Acid-Proof Conveyor", which as been incorporated herein by reference as if fully set forth herein. An alternate embodiment of conveying apparatus is shown in FIGS. 2, 4, 5, 6 and 7 and comprises a plurality of rods 120 around which are disposed, one for each rod, a plurality of rollers 122. Each of the rods 120 pierces baffles 100 and 102 and are sealed with respect thereto by a plurality of bearings 124, two for each rod, which allow rotation of the rods while maintaining the sealed nature of battery processing channel designated generally 112. A plurality of gears 126 are disposed with "upper" battery processing channel 116 adjacent baffle 100. At least one of the plurality of rods 120 extends beyond its associated gear 126 to an acid proof removable coupling 128 which engages drive shaft 130 of roller conveyor motor 92. Roller conveyor motor 92 may be seen in FIG. 2 to be disposed on mounting plate 132 on the exterior surface of tubular member 10. An acid-proof seal, not shown in the drawings, is disposed around drive shaft 130 so that a double acid-proof seal is created between roller conveyor motor 92 and battery processing channel designated generally 112. Since the upper acid-free channel designated generally 116, and particularly that portion of the upper acid-free channel designated generally 116 which is disposed next to bearings 124 will be maintained, as described hereinafter, completely free from any acid contact, the chance of corrosive liquids impinging upon gears 126, coupling 128, drive shaft 130, and most particularly, upon roller conveyor motor 92, is virtually eliminated.

Figure 5:
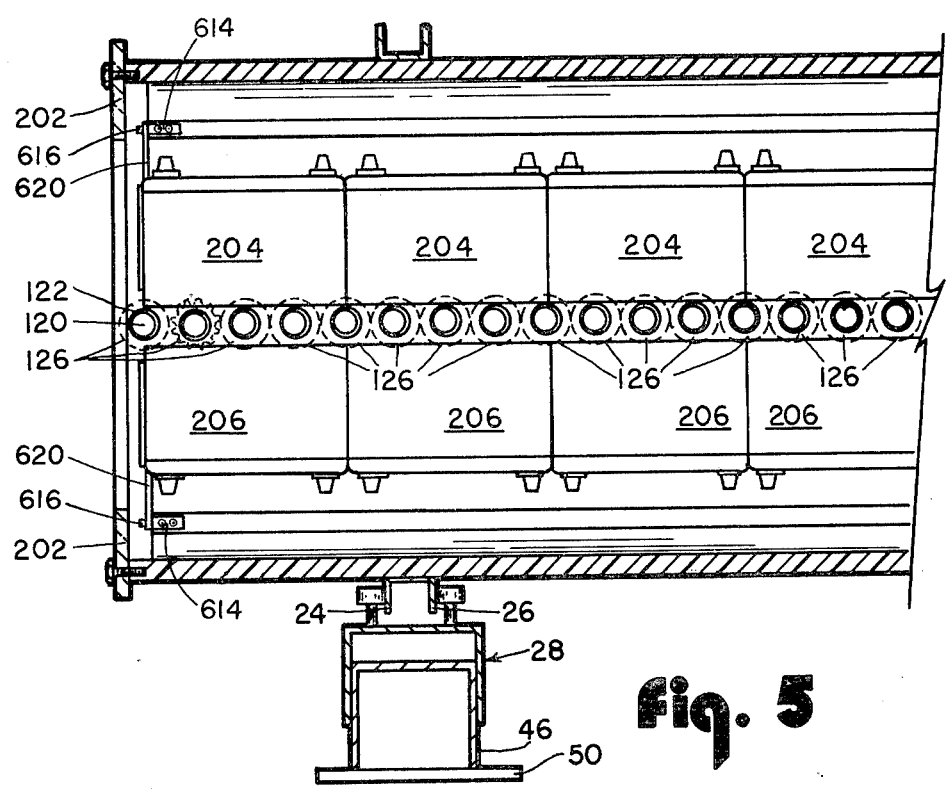
FIG. 5 is a cross section of the preferred embodiment of the present invention taken as indicated by the lines and arrows 5—5 in FIG. 2.
Figure 6:
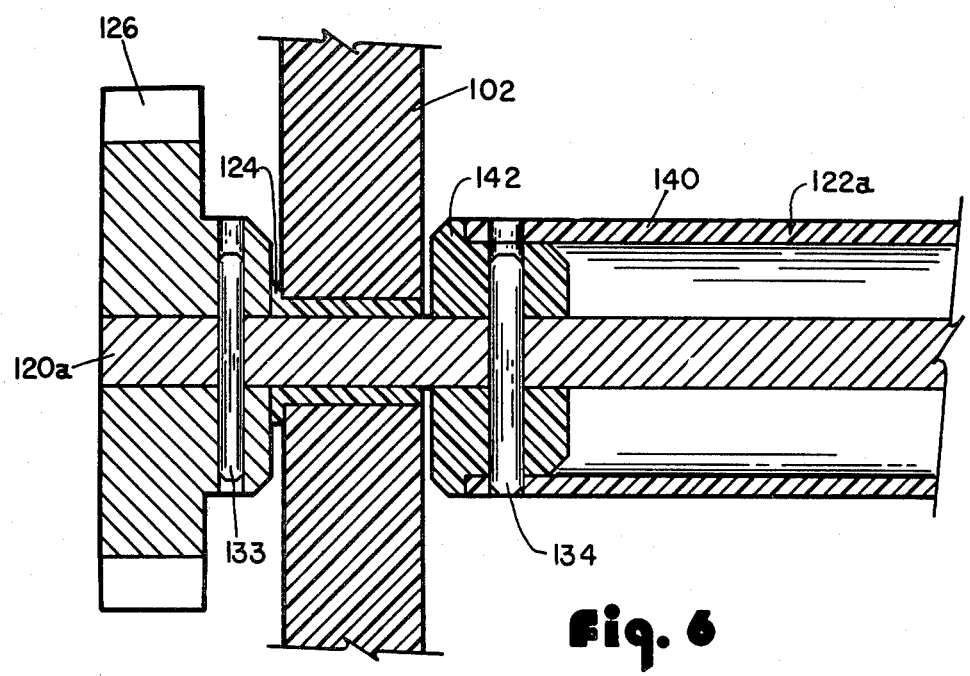
FIG. 6 is a cross section of a portion of the baffle wall showing a powered roller, which view is taken as indicated by the lines and arrows 6—6 in FIG. 4.
Figure 7:
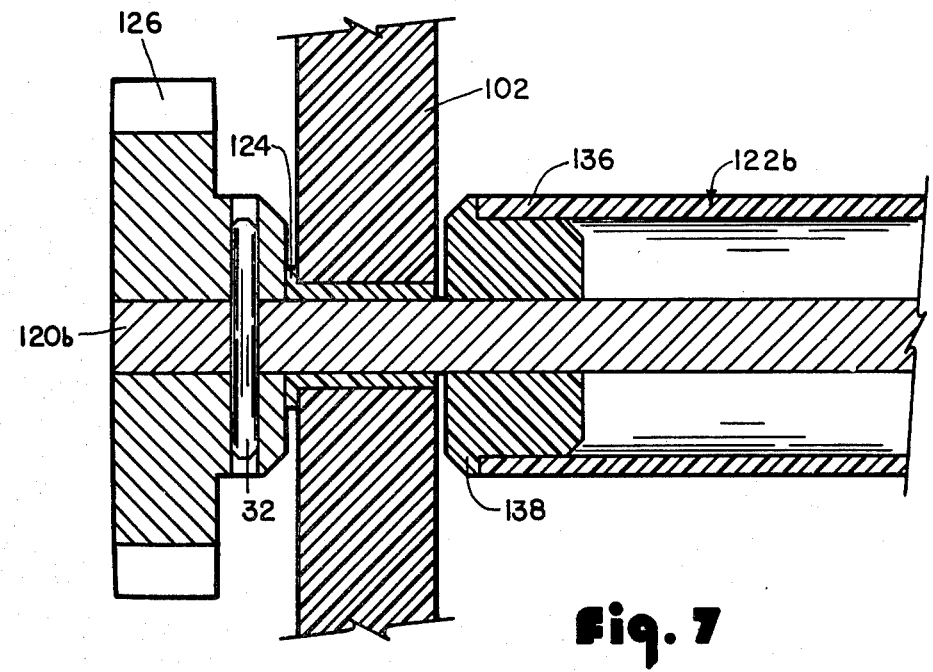
FIG. 7 is a cross section on a greatly enlarged scale similar to FIG. 6 taken as indicated by the lines and arrows 7—7 in FIG. 4 showing a freely rotating roller.

Referring now to FIGS. 6 and 7, the interrelationship between gears 126 and rollers 122 is clearly illustrated. As shown in FIG. 5, gears 126 mesh with each other so that adjacent rods 120 which are pinned thereto by pins 432 will rotate in opposite directions. In order to facilitate the introduction of batteries into and the expulsion of batteries from the apparatus of the present invention, alternate rollers 122a are pinned to alternate rods 120a by conveyor pins 134. Consequently, FIG. 6 illustrates a powered roller while FIG. 7 illustrates in cross section a freely rotating roller. In FIG. 7, the freely rotating roller designated generally 122b is shown to have an outer casing 136 which is supported by a solid bushing 138 which is allowed to rotate with respect to rod 120b. In FIG. 6, conveyor pin 134 and roller designated generally 122 pierces outer casing 140 and solid bushing 142 so that upon rotation of rod 120a roller 122a rotates therewith. FIGS. 6 and 7 also serve to illustrate the proximity of gears 126 to baffle 102, and their disposition with respect to this baffle by means of flanges formed on bearings 124. As will be discussed more fully hereinafter, the use of a single conveying surface with alternately pinned rollers provides a power conveying surface within the battery processing channel having the least possible number of moving parts which might be subject to corrosive attack. Of course, in the preferred embodiment of the present invention all materials used are selected for their resistance to corrosive attack by the particular liquids which are to be dumped from the automotive batteries processed. Examples of such materials are polypropylene, teflon, stainless steel and other materials known for their corrosion resistance to the battery processing apparatus art.

Figure 3:
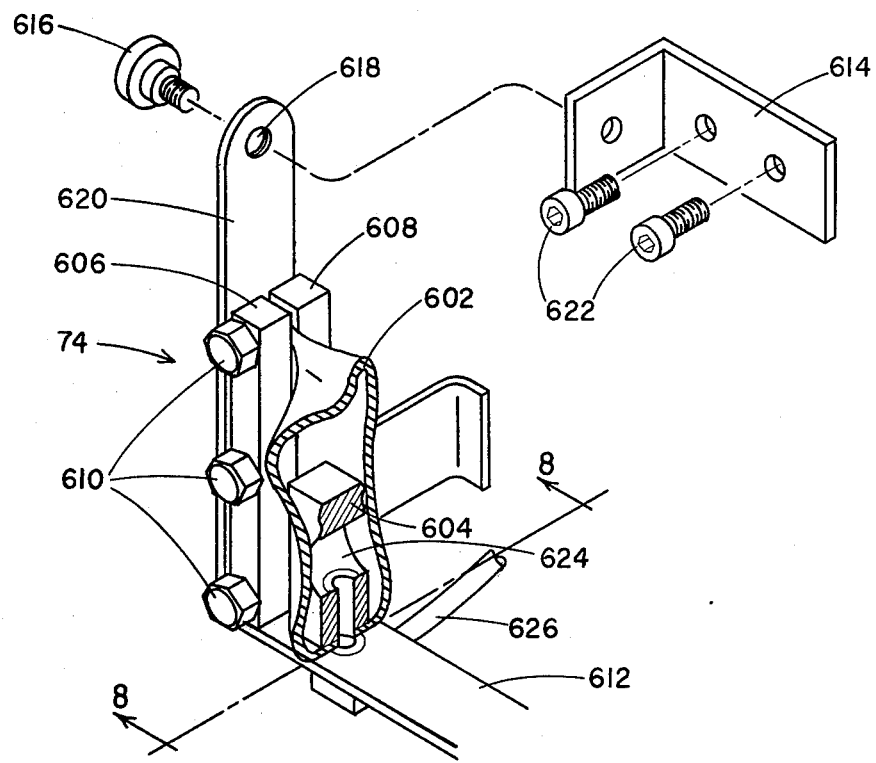
FIG. 3 is an enlarged fragmentary perspective view of one end of an inflatable gripping member.
Figure 4:
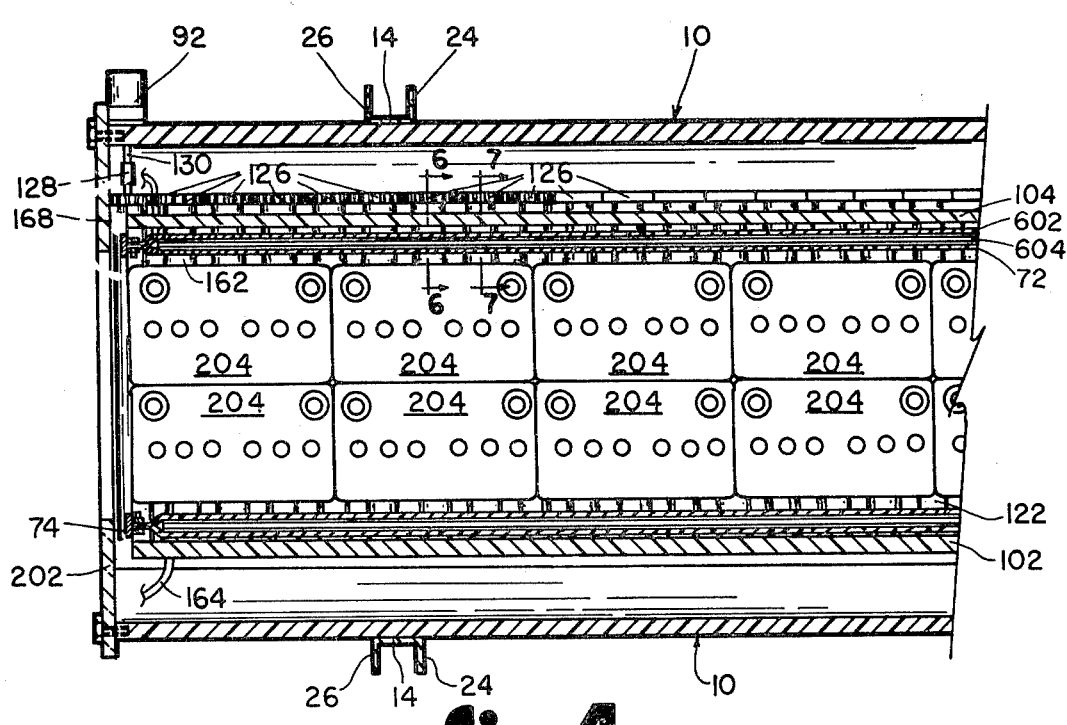
FIG. 4 is a cross sectional top view of the preferred embodiment of the present invention taken as illustrated by the lines and arrows 4—4 of FIG. 2.
Figure 8:
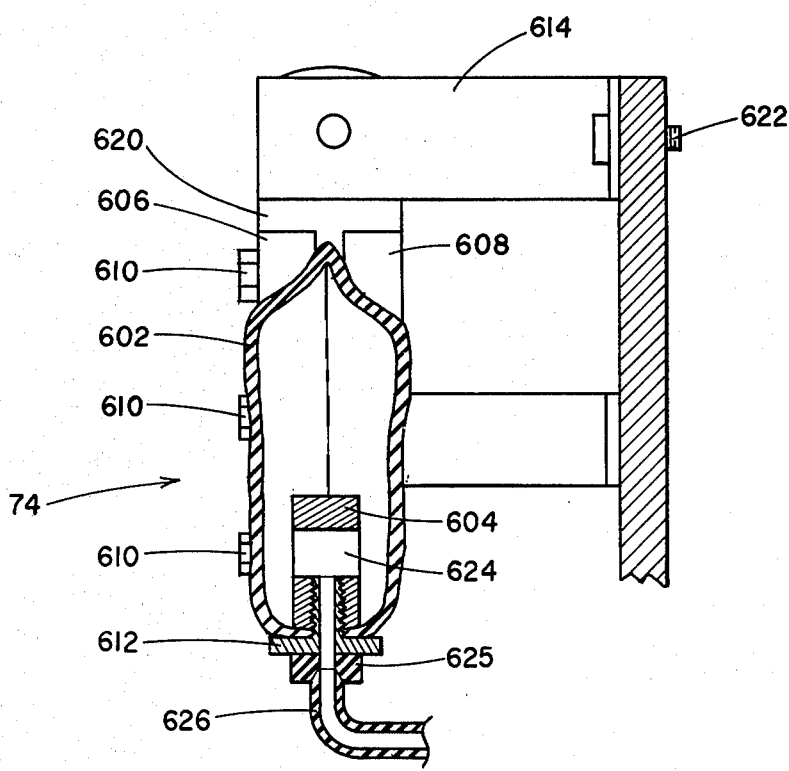
FIG. 8 is a cross section taken along line 8—8 of FIG. 3.
Figure 9:
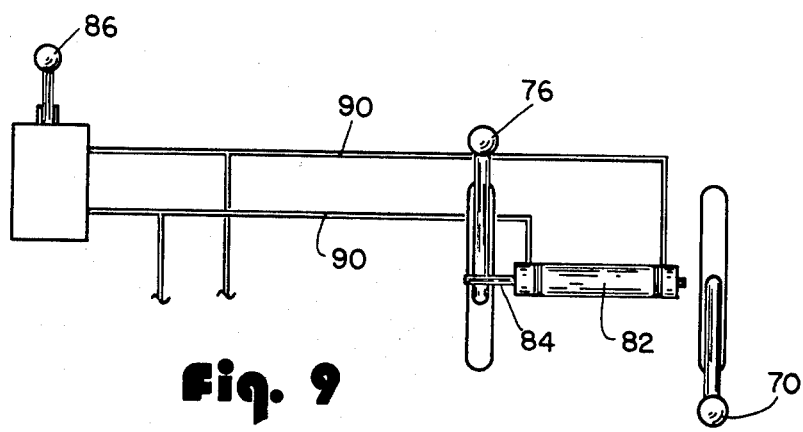
FIG. 9 is a schematic illustration of the safety interlock feature of the present invention showing the hydraulic cylinder extended in a first position.
Figure 10:
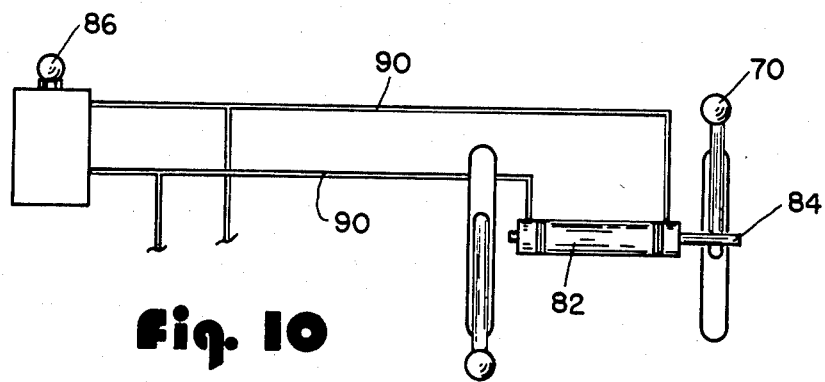
FIG. 10 is a schematic illustration of the safety interlock of the present invention showing the disposition of the piston rod of the hydraulic cylinder in its other position.

As seen in FIG. 2, the conveying surface bisects the battery processing channel 112 into two distinct battery receiving channels 150 and 152 which are substantially mirror images of each other. Appropriately disposed along the edges of the conveying surface are inflatable gripping members 72, 74, 78 and 80, as shown in FIG. 2 and FIG. 4. Although the construction of the inflatable gripping members will be described with reference to inflatable gripping member 74, the description applies as well to inflatable gripping members 72, 78 and 80. As shown in FIGS. 3, 4 and 8, inflatable gripping member 74 includes an elastic acid-resistant tubular member 602 inside of which is disposed an elongated support member 604. The elastic acid-resistant tubular member is preferably a six-inch diameter polyvinyl chloride impregnated fabric hose section. Note that other expansible, elastic, flexible acid-resistant tubes made of material, such as India rubber may also be used. The support member 604 is preferably a one-half inch by three inch mild-alloy steel bar which extends the length of the tubular member 602. Each end of the elastic tubular member 602 is sealed by a pair of sealing blocks 606 and 608, disposed on opposite sides of elastic tubular member 602. The end of the elastic tubular member 602 is compressed between the sealing blocks 606 and 608 by a plurality of bolts 610. The sealed elastic tubular member not only forms a pneumatically inflatable gripping member, as will be more fully described hereinafter, it forms a protective envelope around the elongated support member 604 thereby protecting it from corrosive attack by the dumped liquids. The sealed elastic tubular member with the elongated support member 604 disposed therein is supported by a bracket assembly 612 which runs the length of the inflatable member and turns upward at each end for pivotal attachment to hanging brackets. The bracket assembly 612 is preferably a one and one-half inch by one-quarter inch type 316 stainless steel bar. The bracket assembly is rigidly attached to the elongated support member by capscrews, inserted through apertures in the bracket assembly 612 and the tubular member 602 and threaded into the support member 604 at approximately one-foot intervals along the length thereof. Tightening the capscrews compresses the portion of the tubular member 602 disposed therebetween, creating a pneumatically sealed attachment. This rigid attachment of the bracket assembly to the elongated support member 604 with a portion of the tubular member 602 fixedly disposed therebetween prevents the tubular member 602 from twisting since a twisting motion would reduce the effectiveness of the gripping action. This pivotal attachment is formed at each end by a pivot bolt 616 inserted through an aperture 618 in the upturned portion 620 of the bracket assembly 612 and is threaded into the hanging bracket 614. The hanging bracket 614 is bolted to the triangular bracket 104 by a pair of bolts 622.

In the preferred embodiment, air is introduced to and removed from one end of the inflatable member as illustrated in FIG. 3 and FIG. 8. In these figures there is shown cutout portion 624 in the elongated support member 604. A hollow bolt 625 is inserted throguh apertures in the bracket assembly 612 and the elastic tubular member 602 and is threaded into the elongated support member 604 terminating in the cutout portion 624 thereof. As the hollow bolt 625 is tightened, it compresses the elastic tubular member 602 between the elongated support member 604 and the bracket assembly 612 thereby forming an airtight seal. A pneumatic line 626 is threaded into the exterior portion of the hollow bolt.

In addition to the features already described, the preferred embodiment of the present invention further comprises certain capping features which are intended to allow acid to be poured from the lower end of the apparatus into a trough designated generally 200, and which similarly prevents acid from leaking from the upper ends of the apparatus. As shown in FIG. 1, the entire tubular portion is tilted slightly in one direction so that some liquid will tend to flow towards one end of the tubular member designated generally 10. The higher end of the tubular member designated generally 10 is fitted with a disc-shaped shield 202, as illustrated in FIG. 4, which shield has a rectangular cutout which allows battery 204 and 206 to pass therethrough. Shield 202, which is sealed with respect to the end of tubular member 10, prevents acid disposed within the battery processing channel from leaking out of the upper end of this channel. At the lower end of the battery processing channel a disc-shaped spout 208 similarly engages the end of tubular member 10 with the important exception that this disc-shaped spout has a greater diameter than the outside diameter of the tubular member and further has slots or V-shaped grooves 210 and 212 disposed therein to allow discharged acid to be poured from the lower portion of the battery processing chamber into trough designated 200. Shield 202 has been removed in FIG. 2 for purposes of illustration, whereupon the cutout configuration of spout 208 is seen at the far end of tubular member 10. By creating a lip on spout 208, any acid which runs down the outside of spout 208 will be prevented from running back along the outside of tubular member 10, but will, instead, tend to drip into trough 200.

Referring now to all of the figures, and particularly to FIGS. 9, 10, 11 and 12, the operation of the acid dumping apparatus may now be explained. In the position shown in FIG. 1, groups of batteries 204 are in the upright position resting firmly upon the conveying surface, whereas groups of batteries 206 are in the inverted position and are supported entirely by inflatable gripping members 78 and 80. Note that in the upright position, the bracket assembly 612 supports the elastic tubular member 602, preventing it from drooping and twisting along its length. In the inverted position, the major load, that is the weight of the batteries, is supported by the alongated support member 604 which is disposed inside and now supports the tubular member 602. This permits the bracket assembly 612, which must be resistant to the corrosive action of the dumped fluids, to be less massive than the elongated support member 604 which, since it is disposed entirely between the protective envelope formed by the sealed tubular member 602, need not be made of a corrosive-resistant material. Consequently, the cheaper mild-alloy steel material can be used for the more substantial elongated support member 604 and the more expensive corrosion-resistant type 316 stainless steel material can be used in the less massive bracket assembly.

Figure 11:
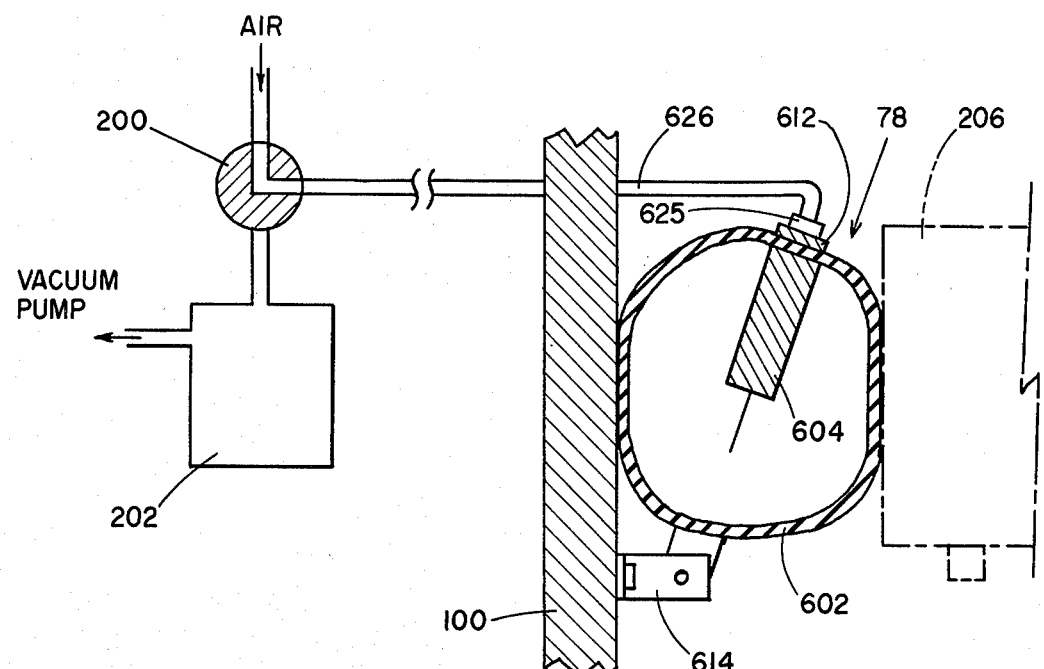
FIG. 11 is a schematic illustration of the vacuum venting feature of the present invention showing the inflatable gripping member in the inflated mode.
Figure 12:
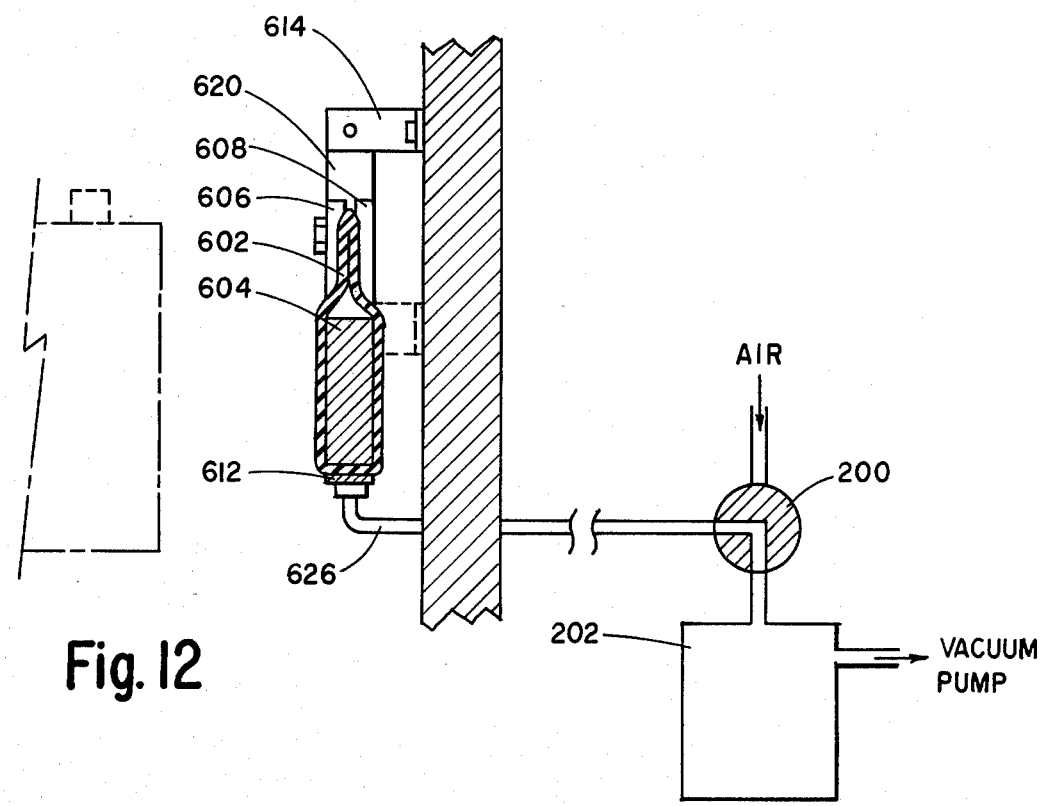
FIG. 12 is a schematic illustration of the vacuum venting feature of the present invention showing the inflatable gripping member in the evacuated mode.

Activation of the appropriate control to produce transfer of the groups of batteries 204 towards the left by activating control 88 to the conveyor motor 92 empties battery retrieving channel 150, allowing for the introduction of a second group of batteries simultaneously from conveying surface 94. These batteries, which are introduced into the apparatus filled with liquid to be dumped, may then be engaged by the inflation of inflatable gripping members 72 and 74 by moving lever 70 into the down or "inflate" position. This causes pneumatic valve 200 to assume the position shown in FIG. 11 thereby permitting compressed air to enter and inflate the inflatable gripping members; for example, inflatable gripping member 74 as shown in FIG. 11. Once inflated, lever 85 may be activated to rotate the drum from the position shown in FIG. 1 to the position in which bracket 20 comes to rest against inflatable tire 31. Upon rotation of the tubular member to this position, piston rod 84 of hydraulic cylinder 82 will be shifted to the other side to block the movement of the appropriate lever from the inflate to the evacuate position. Consequently, piston rod 84 prevents those batteries which are in the down position from being dropped onto the floor of the battery processing channel by preventing the appropriate inflatable gripping members from being evacuated. At the same time, piston rod 84 is removed from interfering with the other lever 76, so that when batteries 206, which were formerly on the bottom, are rotated into the upper position, inflatable gripping members 78 and 80 may be evacuated to release them for subsequent exit from the processing apparatus. Movement of the other lever 76 from the inflate to the evacuate position causes pneumatic valve 200 to assume the position shown in FIG. 12 thereby venting the inflatable gripping member to vacuum tank 202. The vacuum tank is preferably a seven-gallon pneumatically-sealed tank maintained at a vacuum approximately equal to 20 inches of mercury by a vacuum pump, preferably a vane-type (not shown), prior to venting the inflatable member thereto. Note that in this evacuated mode, the inflatable member is substantially compressed, as represented by inflatable gripping members 72 and 74 in FIG. 2. This permits greater clearance for the introduction and removal of batteries and allows the use of large and flexible inflatable members which in turn enhance the versatility of the apparatus by enabling it to grip different sized batteries. In addition, the large and flexible members enable an enhanced shaking action, the significance of which will be described later in this Specification.

Referring now to FIG. 2 and envisioning the dumping operation, it will be seen that the rotation of the drums will cause acid to begin to be dumped first towards baffle 102 and that the dumping will continue until bracket 20 engages inflatable tire 30. At this time, the cushioning effect of bracket 20 hitting tire 30 will cause the entire apparatus within tubular member 10 to shake, which shaking will be amplified by the interrelationship between the inflatable members and the batteries engaged thereby. It can be seen in FIG. 11 that the inflated tubular member 602 provides a considerable flexive support between the baffle 102 and the battery (shown in phantom) being processed. This flexive support provides resilient action which enhances the residual shaking of the batteries after the bracket 20 has come to rest against the tire 30.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In an acid-dumping apparatus of the type having a substantially tubular member with openings at each of the opposing ends thereof and conveyor means disposed therein for the passage of storage batteries therethrough, and which tubular member is selectively rotated through predetermined arcs about its longitudinal axis, an improvement in an assembly for selectively gripping said batteries introduced therein at least during the rotation of said member, said improvement comprising:
    (a) an elongate support member pivotally connected to said tubular member along each edge of said conveyor;
    (b) a tubular, elastic, acid-resistant envelope disposed around said member and supported by said support member along substantially the entire length thereof;
    (c) means for sealing said tubular envelope at each end thereof in order to form an inflatible gripping member; and
    (d) means for inflating and deflating said gripping members.

2. The invention of claim 1 wherein said means for inflating and deflating said gripping means comprises:
    (a) a fluid opening in fluid communication with the interior of said gripping member;
    (b) exhaust means; and
    (c) valve means for selectively connecting pressurized fluid to said fluid opening in order to inflate said gripping means and said exhaust means to said fluid opening in order to deflate said gripping means.

3. The invention of claim 2 wherein said exhaust means comprises:
    (a) fluid accumulation means for receiving fluid from inflated gripping means; and
    (b) means for providing a pressure differential between said fluid accumulation means and said inflated gripping means, said fluid accumulation means being at the lower pressure.

4. The invention of claim 3 wherein said fluid comprises air.

5. The invention of claim 4 wherein said fluid accumulation means comprises a pneumatically-sealed tank.

6. The invention of claim 5 wherein said means for providing a pressure differential comprises a vacuum pump pneumatically connected to said tank for evacuating said tank to a predetermined level.

7. The invention of claim 1 wherein said tubular, elastic acid-resistant envelope comprises a nylon fiber-reinforced nylon tube.

8. The invention of claim 1 wherein said tubular, elastic acid-resistant envelope comprises an India rubber tube.

* * * * *